United States Patent

Baumeister

[11] Patent Number: 5,614,776
[45] Date of Patent: Mar. 25, 1997

[54] DEVICE FOR CONNECTING A MOTOR WITH AT LEAST TWO ELECTRIC CONDUCTOR TRACKS

[75] Inventor: Udo Baumeister, Bietigheim-Bissingen, Germany

[73] Assignee: ITT Automotive Europe GmbH, Germany

[21] Appl. No.: 381,943

[22] PCT Filed: Jul. 14, 1993

[86] PCT No.: PCT/EP93/01844

§ 371 Date: May 23, 1995

§ 102(e) Date: May 23, 1995

[87] PCT Pub. No.: WO94/05071

PCT Pub. Date: Mar. 3, 1994

[30] Foreign Application Priority Data

Aug. 11, 1992 [DE] Germany ............... 42 26 509.6

[51] Int. Cl.$^6$ ................................................ H02K 11/00
[52] U.S. Cl. ................................................ 310/71; 310/42
[58] Field of Search .................... 310/71, 40 MM, 310/42, DIG. 6; 439/926, 76, 79

[56] References Cited

U.S. PATENT DOCUMENTS

| 4,370,579 | 1/1983 | Kobayashi et al. | 310/50 |
| 4,602,429 | 6/1986 | Nicoll | 29/884 |
| 4,656,378 | 4/1987 | Atherton et al. | 310/71 |
| 5,011,417 | 4/1991 | Matsumoto et al. | 439/76 |
| 5,063,320 | 11/1991 | Watanabe et al. | 310/270 |
| 5,118,300 | 6/1992 | Zarreii | 439/79 |
| 5,287,028 | 2/1994 | Suzuki et al. | 310/71 |

FOREIGN PATENT DOCUMENTS

| 106869 | 9/1967 | Denmark | 439/79 |
| 0539094A2 | 4/1993 | European Pat. Off. | H02K 33/66 |

OTHER PUBLICATIONS

International Search Report for Application PCT/EP93/01844 filed Jul. 14, 1993.

Primary Examiner—Steven L. Stephan
Assistant Examiner—Jonathan Link
Attorney, Agent, or Firm—J. Gordon Lewis; Thomas N. Twomey

[57] ABSTRACT

A pluggable adapter for connecting a miniature electric motor, especially of a central locking device of an automotive vehicle, with the end pieces of conductor tracks and to accommodate the motor in the housing. Soldering is no longer necessary and there aren't any disturbing cables.

17 Claims, 4 Drawing Sheets

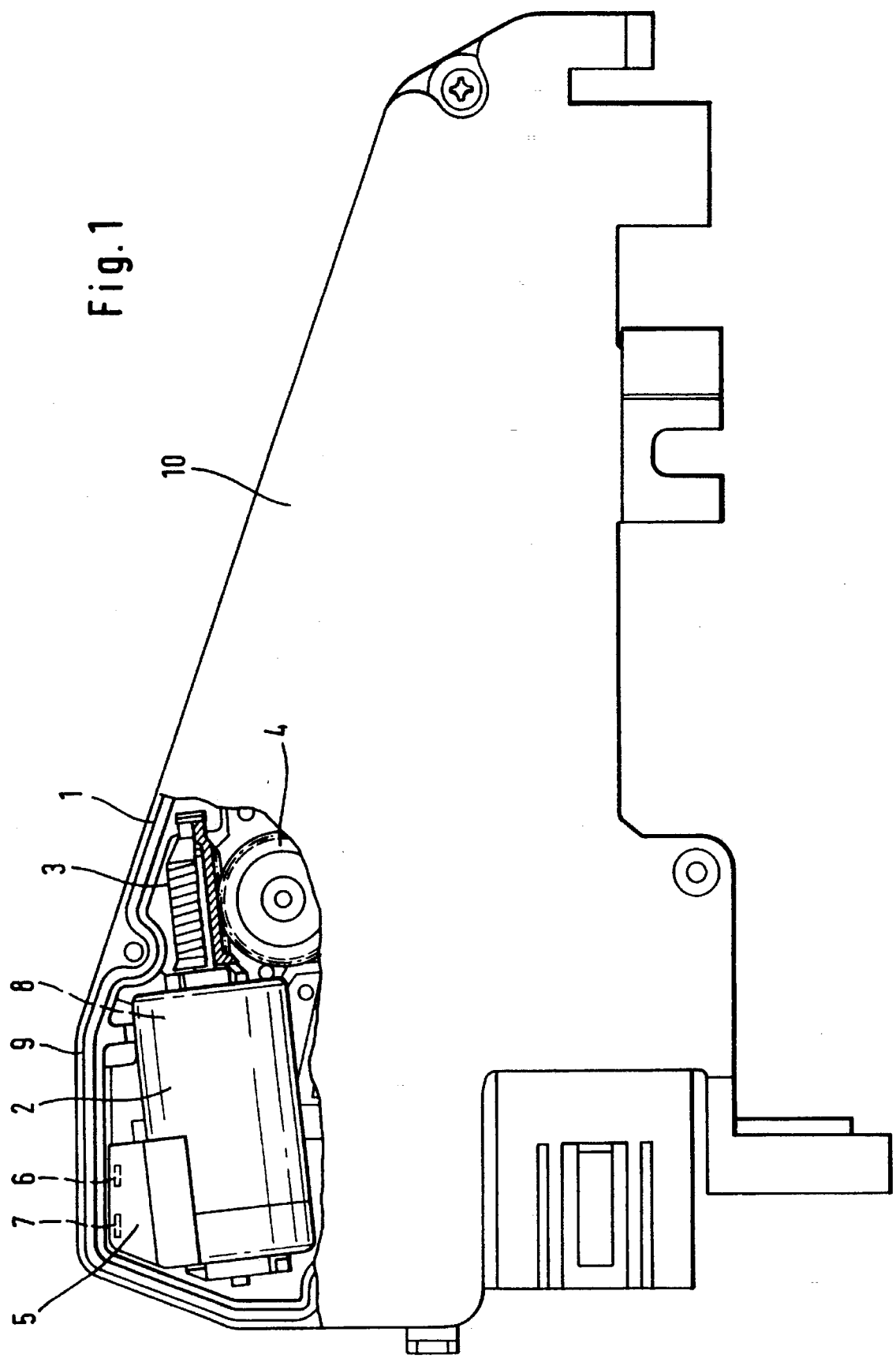

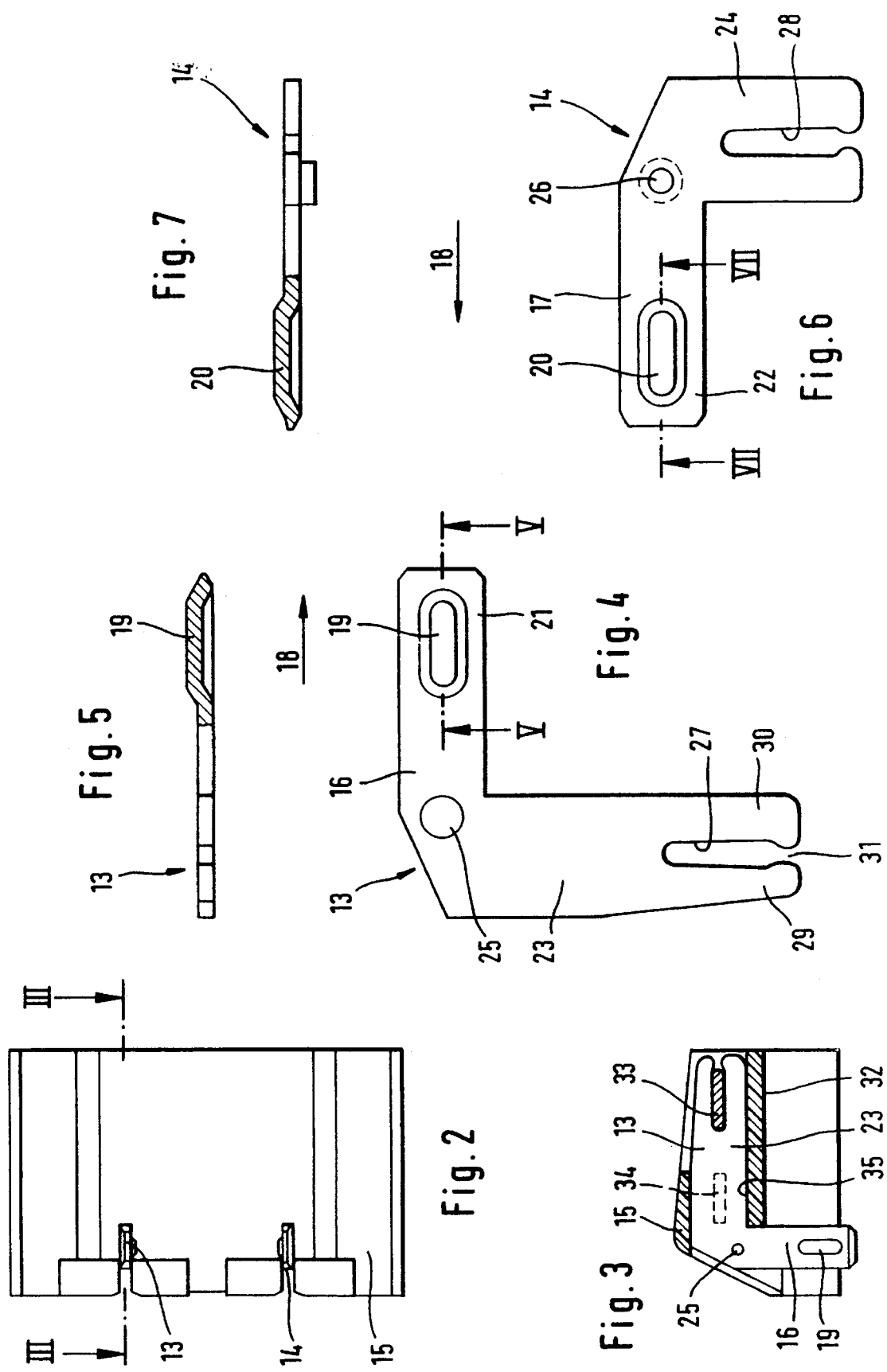

5,614,776

DEVICE FOR CONNECTING A MOTOR WITH AT LEAST TWO ELECTRIC CONDUCTOR TRACKS

TECHNICAL FIELD

The present invention relates to a device for the connection of a miniature electric motor with at least two electric conductor tracks of a printed-circuit board, particularly with regard to the housing of a central locking device of an automotive vehicle, the miniature motor presenting one socket per conductor track end to be inserted.

BACKGROUND OF THE INVENTION

Today miniature motors are applied in connection with different servo devices. In the automobile industry there are many applications of such servo devices, e.g. for opening and closing the windows or also for actuating a central locking device. The miniature motor or even several miniature motors have to be connected in the designated way with conductor tracks of a printed-circuit board or the like.

Originally, each motor was provided with a cable connection and the cable was connected with the conductor tracks of the printed-circuit board by plugging or soldering it. Attempts have also been made to connect contact sheets of the motor with flat plugs. These connections are expensive and time consuming since they have to be realized manually. Furthermore it is often undesirable to lay cables in the housing of the device because the cable can hinder the motion of the moving components. This applies especially when the device provided with one or more motors is exposed to vibrations, as is always the case in automobiles.

In another known version, such miniature motors are provided with slide connectors which protrude from the motor like the contact sheets do. These slide connectors are pushed into the openings of the conductor tracks and soldered directly to them. Although in this case no cable is involved, the miniature motors must have a precisely defined position in relation to the printed-circuit board or the conductor tracks in question. This defined position often does not correspond to the desired mounting position of the motor. This is especially true when the motor is not provided with a circular, but an oval or similar non circular housing. Furthermore the layout of the conductor tracks depends on the conformation of the motor. Modifications of the motor generally leads to a corresponding modification of the conductor tracks. This is time consuming and usually also very expensive.

The object of the present invention is therefore to develop the device mentioned at the beginning in such a way, that the motor can be mounted simply and quickly despite the absence of a cable connection and that small modifications of the motor do not involve any or at least any important adaptation to the connection of the printed-circuit board.

This object is achieved according to the present invention by putting the adapter between the end pieces of the conductor tracks and sockets of the motor. This arrangement provides for an electrically conductive connection between the motor and the conductor tracks and permits the quick adaptation to a slightly modified motor and/or modified end pieces of the conductor tracks. In addition to this, the connection of the motor with the adapter as well as the connection of the adapter with the end pieces of the conductor tracks is pluggable, so that cables are no longer necessary. The respective plug-in connections can be designed as already known. Therefore the miniature motor, e.g. coupled with the adapter, can be connected easily, quickly and safely with the end pieces of the conductor tracks, or in the specific case, with the central locking device, all prerequisites for an automatic assembly being given.

In another improvement of the present invention, the ends of the electrically conductive elements close to the motor are formed as plug pins which are retained in the sockets of the miniature motor in a clamped way. In this case the sockets have a flat plug-in opening in which the electrically conductive elements are plugged in an elastically clamped manner.

In another aspect of the present invention, the lateral distance of the ends of the electrically conductive elements close to the motor corresponds to the lateral distance of the sockets of the miniature motor so that both can be coupled by a linear motion and at the same time be connected in an electrically conductive way.

For reasons of cost and weight, the material thickness of the electrically conductive elements should be as small as possible. Stamped parts, however, must present a minimum thickness because of the stamping procedure. If the sockets after a modification of the miniature motor are provided with somewhat wider insertion slots for the electrically conductive elements, it may be possible that a tight fit of the electrically conductive elements in the sockets can no longer be ensured. In another embodiment of the present invention, an improvement is achieved in that the flat sides of the electrically conductive elements are parallel and each one shows a depression, particularly extending in the plug-in direction, which leads to enlarged ends of these electrically conductive elements to be inserted so that, at least in case of elastically expanding sockets, also small dimensional tolerances near the sockets can be compensated within certain limits.

The depressions of the two electrically conductive elements are directed towards each other in a particularly preferred manner. Since the form of the two electrically conductive elements is, apart from that, essentially similar, the different position of the depressions with regard to their flat sides provides for a certain identification which permits an automatic sorting. This is the prerequisite for an automatic or at least semi-automatic assembly. As for the rest, the electrically conductive elements can be retained in the base member of their adapter in one of the known ways, e.g. by jamming or by extrusion if the adapter, as foreseen in the present embodiment, is made of plastic material.

Preferably, the electrically conductive elements have an essentially angular shape. This means that when the electrically conductive elements abut loosely on a surface, one leg is parallel to the one of the other electrically conductive elements and their depressions point upwards, the other leg points into the opposite direction. This can be exploited for the identification of the single parts.

As already mentioned, the electrically conductive elements can be plugged into the base member or extruded with its material. In a variant of the present invention, preferred in this regard, clamping engagement is easily achieved by the depression, nipple provided the insertion slot or the material in this area is sufficiently yielding so that the depression or nipple can penetrate to some extent. A favorable variant is also to clamp the electrically conductive element by means of a snap connection in which the nipple snaps in behind a projection or undercut.

As already mentioned, the adapter and the end parts of the conductor track can be connected in a pluggable manner. In to ensure that this plug-in connection is vibration proof and to secure it, it is advisable to make each end piece of the conductor track engage between two fork prongs on the leg of the angle which is remote from the motor. The length of the parallel part of the fork prongs and therefore the constant width of the insertion slot corresponds to the width of the conductor track.

A particularly preferred variant of the present invention ensures that the unit consisting of the adapter and the miniature motor can be slipped onto the end pieces of the conductor track by a simple linear movement which permits a fully automatic assembly and excludes wrong electrical connections in each of the two connecting points.

In order to ensure a safe electrical connection between the end pieces of the conductor track and the adapter or its electrically conductive elements, an enlargement at the insertion end of each end piece of the conductor track is provided for, in particular a depression extending in the plug-in direction, which is associated with the space between the parallel parts of the fork prongs. By this it is also possible to achieve a tight mechanical connection which certainly leads to a high electrical safety of these connecting points.

Developments being of particular advantage to the fully automatic connection of the adapter or the unit consisting of adapter and miniature motor with the end pieces of the conductor track, are described. First of all, the insertion slopes permit a safe connection between the adapter and the end pieces of the conductor track even if there is a slight deviation from the correct position. By means of the insertion slopes, they are introduced safely into the insertion slots on the inside of which are positioned the forks of the two electrically conducting elements which are coupled mechanically and in an electrically conductive manner to the end pieces of the conductor track when the adapter is slipped onto these end pieces.

BRIEF DESCRIPTION OF THE DRAWINGS

FIG. 1 is the top view of a central locking device of the present invention with fitted miniature motor which is connected electrically by means of the device being object of the present invention, the cover being partly broken away.

FIG. 2 is a top view of the adapter surface close to the motor with fitted electrically conductive elements, on an enlarged scale.

FIG. 3 is a cross-sectional view of FIG. 2 taken along line III—III.

FIG. 4 is an enlarged view of an electrically conductive element.

FIG. 5 is a front view of this element, partly cut along line V—V.

FIG. 6 is a top view of the other electrically conductive element.

FIG. 7 is a representation corresponding to FIG. 5, partly cut along line VII—VII of FIG. 6.

DETAILED DESCRIPTION OF THE PREFERRED EMBODIMENTS

Figure 10:
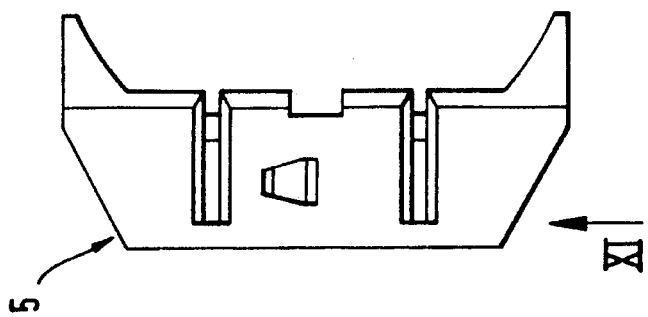
FIG. 10 is a side view of the adapter in the direction of arrow X of FIG. 8.
Figure 11:
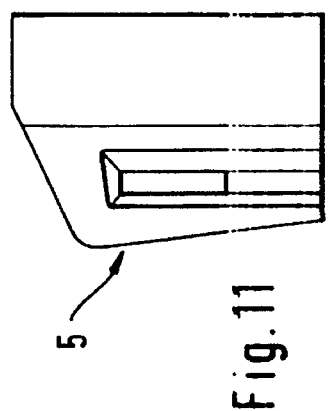
FIG. 11 is a view of the adapter in the direction of arrow XI of FIG. 10.
Figure 8:
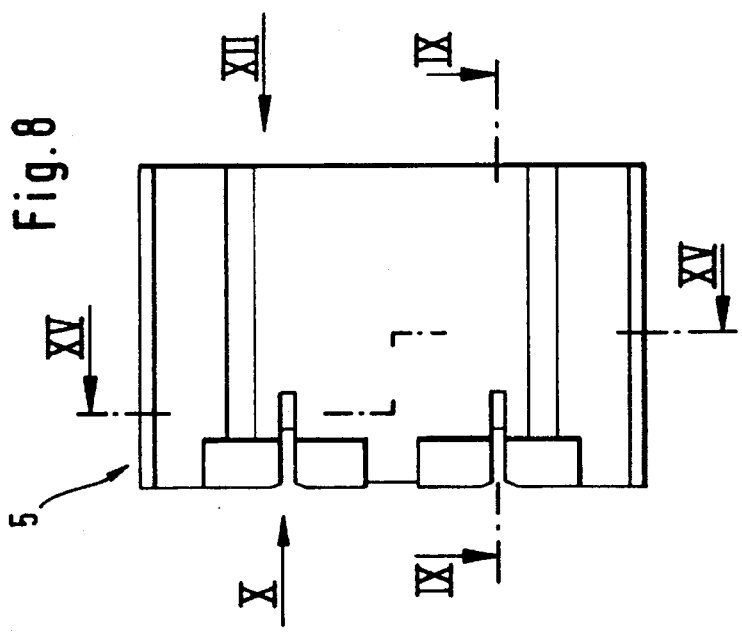
FIG. 8 is a representation according to FIG. 2 without the electrically conductive elements.
Figure 9:
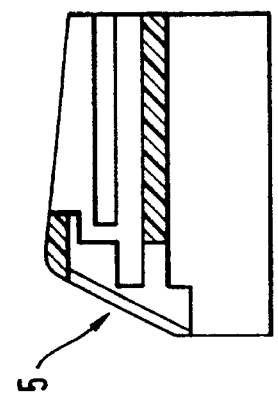
FIG. 9 is a cross-sectional view along line IX—IX of FIG. 8.

In the housing 1 of a central locking device for an automotive vehicle, there is a miniature electric motor 2 driving a worm 3. This worm meshes with a worm wheel 4. According to the present invention, the miniature electric motor 2—hereinafter referred to as "motor"—is connected in an electrically conductive way with two electrical conductor tracks 6 and 7 by means of an adapter 5, the conductor tracks being attached to a printed-circuit board 8 which is not represented in detail and which in this embodiment is fixed at the bottom on the inside of the device housing 9 or is made of the bottom itself being the carrier of the punched conductor tracks. The device housing 9 is closed to the outside by means of a cover 10. The end pieces of the conductor tracks on which in FIG. 1 the adapter 5 is slipped perpendicularly from above to the bottom, extend therefore from the bottom of the housing 1 perpendicularly towards the top and the person who looks at the drawing.

In FIGS. 8 to 14 the adapter 5 is represented in detail. FIGS. 2 and 3 show the adapter 5 equipped with the electrically conductive elements which are represented on an enlarged scale in FIGS. 4 to 7.

Figure 12:
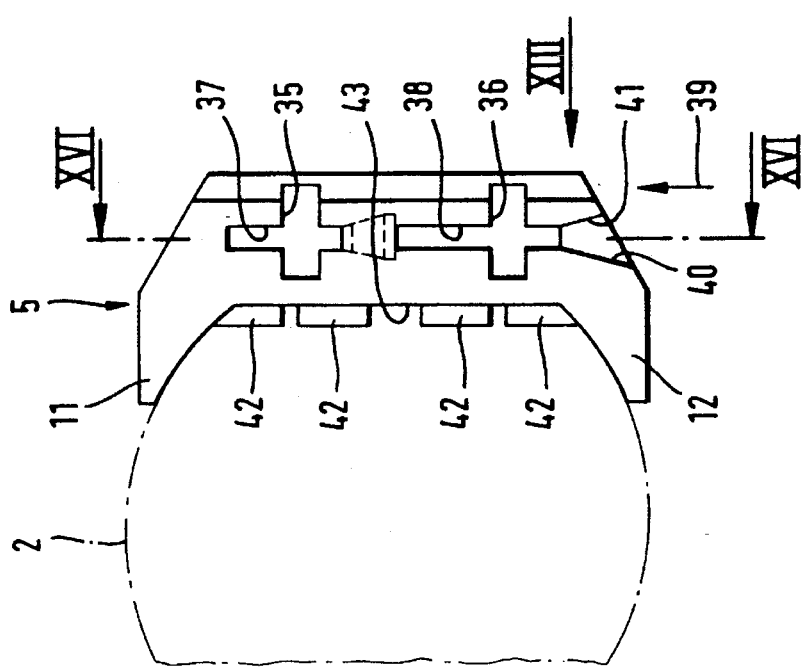
FIG. 12 is a view of the adapter in the direction of arrow X of FIG. 8.
Figure 16:
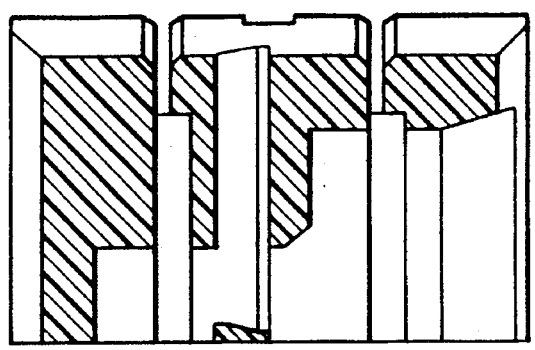
FIG. 16 is a cross-section along line XVI—XVI of FIG. 12.
Figure 15:
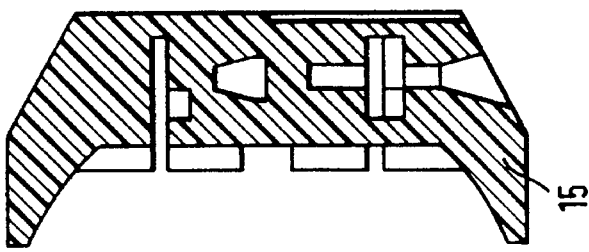
FIG. 15 is a cross-section along line XV—XV of FIG. 8.
Figure 14:
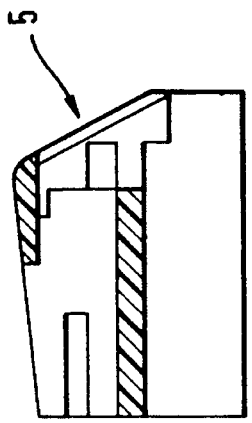
FIG. 14 is a cross-section along line XIV—XIV of FIG. 13.
Figure 13:
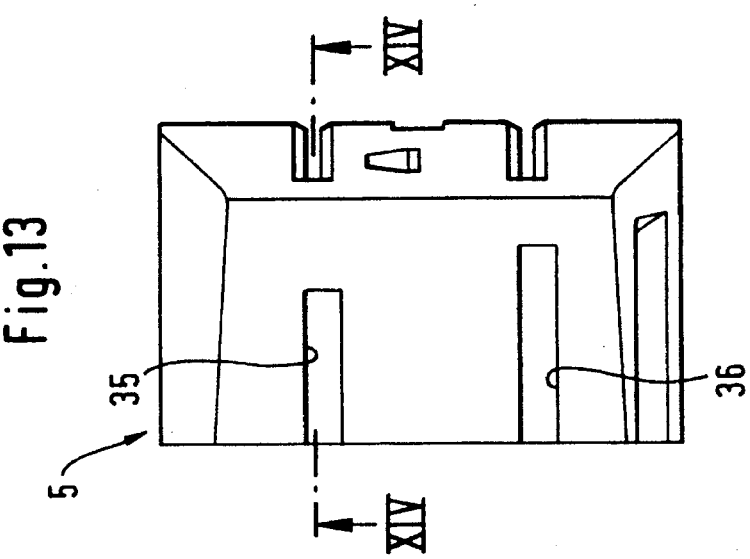
FIG. 13 is a view of the adapter in the direction of arrow XIII of FIG. 12.

According to e.g. FIGS. 10 and 12, the adapter 5 is essentially bow-shaped or groove-shaped. This depends on the motor 2 showing a regular cylindrical section with two parallel flat portions and the adapter 5, according to FIG. 12, being attached to one of these flat portions. Its two legs 11 and 12 each are associated with one of the curved housing walls or encompass these in part.

The electrically conductive elements 13 and 14 showing, according to FIGS. 4 and 6, an essentially angular shape, in the present embodiment are simply plugged into the base member 15 of the adapter 5, but could also be embedded into the plastic material of the base member 15, i.e. extruded by it. From FIGS. 4 and 6 further discloses electrically conductive elements having a different size. With regard to the geometrical dimensions, leg 16 of the electrically conductive element 13 corresponds to leg 17 of the electrically conductive element 14. Each leg 16 or 17 is provided with a depression 19 or 20 extending in its longitudinal direction and therefore also in the direction 18 in which the adapter 5 is slipped on the motor 2. In FIGS. 4 and 6 the projections of the depressions are pointing upwards, i.e. towards the person who looks at the drawing. When mounted, the ends 21 or 22 of the electrically conductive elements 13 and 14 being close to the motor, point in the same direction so that the two depressions 19 and 20 are directed towards each other. This explains why the arrows for the slip-on direction 18 are opposite to each other in FIGS. 4 and 6.

Approximately in the transition point from one leg 16 or 17 to the other one 23 or 24 there is a further indentation or depression 25 or 26 which in the embodiment is circularly limited on the outside. It extends in relation to the depression 19 or 20 in the opposite direction, i.e. in FIG. 4 or 6 downward, and serves for clamping the referred electrically conductive elements 13 or 14 in the base member 15 by means of a snap connection which will subsequently be described more in detail.

The free end of the other leg 23 or 24 has a forked shape, i.e. it is provided with an open slot 27 or 28. In order to form a throat, the free ends of the fork prongs 29 and 30 are deflected towards each other or the sides of the slot are bulged towards the inside. In FIG. 4 the throat is indicated with 31.

Every leg 16 or 17 of the electrically conductive element 13 or 14 provided with a depression 19 or 20 projects from the surface 32 of the base member 15 of the adapter 5 being close to the motor 2 or adjacent to it and extends also perpendicularly to this surface. Both legs 16 and 17 are parallel to each other and thus also to the drawing plane and protrude from the surface 32 to an equal extent. Each leg can be inserted into a socket of the electric motor 2 which is not illustrated, the depression 19 or 20 providing for a good electrical contact and a retaining of the adapter 5 by jamming it to the motor 2. The sockets are provided with a slot and can also be formed, e.g., by a U-formed element, leg 16 or 17 engaging between its legs.

When the adapter is mounted, the end piece of the conductor track, indicated with 33 in FIG. 3, is positioned inside the throat 31, i.e. at the point where the open slot 27 or 28 is limited by two parallel borders. In FIG. 3 it extends perpendicularly to the drawing plane. This means that the adapter 5 being fixed to the miniature electric motor is slipped, perpendicularly to the drawing plane in FIG. 3, from above to the bottom onto the end pieces of the conductor track. In order to illustrate this, in FIG. 3 also the other end piece of conductor track 34 is drawn with a dashed line. But it does not extend upward as much as the end piece of conductor track 33, because the electrically conductive element 14 with the shorter leg 24 that is remote from the motor, is positioned underneath leg 23. In FIG. 3 can also be seen why the other leg 24 is shorter than leg 23 of the electrically conductive element 13. The distance between the electrically conductive elements 13 and 14 can be learned from FIG. 2.

At the plug-in or push-in end of each end piece of the conductor tracks, 32, 34, there is an enlargement (a depression) extending in the plug-in direction, which corresponds to depression 19 or 20 of the electrically conductive elements 13, 14. For the sake of clarity it is not indicated in FIG. 3. This depression is exactly associated with the forked area of the electrically conductive elements, so that the fork prongs can be expanded elastically providing a good mechanical and electrically conductive contact.

The other leg 23 or 24, which is remote from the motor, is inserted in a slot 35 or 36 (FIGS. 12 and 3) and retained in this slot by clamping it with depression 25 or 26, the slot having an angular form according to FIG. 3, so that the whole electrically conductive element 13 or 14, with the exception of the free end of leg 16 or 17, is entirely accommodated in the base member 15 made of plastic material and is therefore stored safely from an electrical point of view.

Each slot 35 and 36 is crossed by another slot 37 or 38 (FIG. 12). Furthermore each slot accommodates an end piece of a conductor track. The open slot 27 or 28 of the leg 23 or 24 remote from the motor, is in alignment with the slot 37 or 38 so that the end pieces of the conductor tracks can be pushed through in the direction of arrow 39 when the adapter 5 is mounted. In practice, however, the adapter 5 with the electric motor 2 will be slipped onto the end pieces of the conductor tracks, 33, 34, in the opposite direction to arrow 39. In order to permit a good insertion of the end pieces of the conductor track, the end portion, i.e. at the point where slot 37 passes into slot 38, is provided with insertion slopes 40, 41. Certainly, slot 38 in direction of arrow 39 is shorter than slot 37 which has to accommodate the longer end piece of conductor track 33. According to FIG. 13, this is also true for the slots 35 and 36.

FIG. 12 indicates also shoulders 42 which engage in corresponding recesses of the motor housing and therefore improve safe positioning as well as mounting. A center groove 43 can engage with a spring shaped at the motor housing.

From the above details, it can be easily seen that the two electrically conductive elements 13 and 14 can be identified by means of a sorting device and the above mentioned identification and can be inserted into the base member 15 or into the foreseen slot in fully automatic way. However, it is not only possible to mount the electrically conductive elements 13 and 14 to the adapter 5 in fully automatic way, but also to slip the adapter automatically onto the electric motor 2. Finally, the unit consisting of the miniature electric motor 2 and the adapter 5 can also be slipped onto the end pieces of the conductor tracks, 33 and 34, in an automatic procedure. This leads without doubt to a reduction of the assembly costs and contributes to an increased production and a reduced rejection rate. Small modifications of the miniature electric motor can be compensated easily by modifying the base member 15 and/or the electrically conductive elements 13, 14, slight changes at the plug-in sockets of the electric motor being compensated, if necessary, already only by the depressions 19 and 20 of the electrically conductive elements 13, 14.

Often the electric motor 2 does not have a circular, but a non circular cross-section. By means of adapter 5, designed in the form described above, such a motor can be mounted on edge in housing 1 of the central locking device and thus be accommodated saving much space.

I claim:

1. Device for connecting a miniature electric motor to at least two electric conductor tracks of a printed circuit board, said miniature motor being provided with one socket for each end piece of each of said electric conductor tracks, said end pieces of said conductor tracks projecting substantially vertically from a plane of said printed circuit board, said device comprising an adapter between said miniature electric motor and said printed circuit board, said adapter being formed of a base member and at least two electrically conducting elements, said base member of said adapter including a slot extending in a direction in which it is slipped onto said end pieces of said conductor tracks, said end piece of each of said conductor tracks electrically connected to a respective socket of said miniature electric motor through said electrically conducting elements, end portions of said electrically conducting elements proximate to said motor forming flat plug pins retained in said sockets, wherein end portions of said electrically conducting elements, remote from said motor, cross said slot.

2. Device as claimed in claim 1, wherein the electrically conductive elements are retained in the base member of the adapter by means of a snap connection, each of said elements being provided at least with one protruding depression means, which extends transversely relative to its plane.

3. Device as claimed in claim 2, wherein the electrically conductive elements have angular shape.

4. Device as claimed in claim 3, wherein the electrically conductive elements are inserted into the base member of adapter in the longitudinal direction of the leg which is remote from the motor.

5. Device as claimed in claim 4, wherein the electrically conductive elements are retained in the base member of the adapter by jamming them, each of said elements being provided at least with one protruding depression means which extends transversely relative to its plane.

6. Device as claimed in claim 3 wherein the leg of the angle of each electrically conductive element which is remote from the motor, has a fork-like shape.

7. Device as claimed in claim 6, wherein free ends of the two fork prongs are shaped in order to form a throat.

8. Device as claimed in claim 7, wherein the motor with the adapter is slipped onto the free end pieces of the conductor track perpendicularly to the plane of the electrically conductive elements, which are parallel to each other.

9. Device as claimed in claim 8, wherein at the insertion end of each end piece of the conductor tracks there is an enlargement shaped as a depression which is associated with a slot between the parallel parts of the fork prongs, said depression extending in the direction parallel to said parallel parts.

10. Device as claimed in claim 9, wherein said slot provided in the base member of the adapter crosses the slots foreseen for said end portions of the electrically conductive elements which are remote from the motor, the slots between the parallel parts of the forked prongs being positioned between sections of said slot in the base member.

11. Device as claimed in claim 10, wherein the slots at their end for the insertion of the end pieces of the conductor tracks are expanded in order to form insertion slopes.

12. Device as claimed in claim 11, wherein the conductor tracks are fastened at the bottom of the housing of the central locking device and the flat end pieces of the conductor tracks extend parallel to a side wall of the housing, pointing to a housing cover.

13. Device as claimed in claim 1, wherein said end portions of the electrically conductive elements close to the motor project from a surface of the adapter, face the motor, and are parallel to each other and perpendicular to said surface.

14. Device as claimed in claim 1, wherein said end portions of said electrically conducting elements forming flat plug pins are parallel to each other, each one presenting a depression extending in longitudinal direction of said end portions.

15. Device as claimed in claim 14, wherein said depressions point toward each other.

16. Device as claimed in claim 15, wherein the adapter and the motor are arranged adjacent to each other.

17. Device as claimed in claim 6, wherein the adapter has a bow-shaped design, two bow legs which protrude in the slip-on direction encompassing a housing of the motor on the outside.

* * * * *